(12) United States Patent
Farentinos

(10) Patent No.: US 7,055,724 B2
(45) Date of Patent: Jun. 6, 2006

(54) SUPPORT UNIT FOR PICKUP TRUCK

(76) Inventor: Steven N. Farentinos, 5030 Deelane St., Torrance, CA (US) 90503

( * ) Notice: Subject to any disclaimer, the term of this patent is extended or adjusted under 35 U.S.C. 154(b) by 395 days.

(21) Appl. No.: 10/605,300

(22) Filed: Sep. 21, 2003

(65) Prior Publication Data
US 2005/0061841 A1 Mar. 24, 2005

(51) Int. Cl.
B60R 9/048 (2006.01)
B60R 9/055 (2006.01)

(52) U.S. Cl. .................. 224/404; 224/403; 224/557; 296/37.6

(58) Field of Classification Search .............. 224/404, 224/403; 220/845, 848, 322, 323, 831, 833, 220/835, 478, 476; 296/37.6; 312/242, 312/316, 327, 328; 232/42, 45, 19; 292/300, 292/304, 296, DIG. 11, DIG. 17
See application file for complete search history.

(56) References Cited

U.S. PATENT DOCUMENTS

| 1,441,410 | A | * | 1/1923 | Warner | 312/242 |
| 2,754,079 | A | * | 7/1956 | Krueger et al. | 248/311.2 |
| 2,765,949 | A | * | 10/1956 | Swan | 220/835 |
| 3,036,749 | A | | 5/1962 | Evans | |
| 3,411,653 | A | * | 11/1968 | Pearce | 217/57 |
| 3,451,580 | A | * | 6/1969 | Husby | 220/4.21 |
| 3,464,606 | A | * | 9/1969 | Nordeen | 224/281 |
| 3,893,568 | A | | 7/1975 | Lile | |
| 4,728,017 | A | | 3/1988 | Mullican | |
| 5,052,737 | A | | 10/1991 | Farmer, Jr. | |
| 5,056,342 | A | * | 10/1991 | Prinz | 70/63 |
| 5,118,156 | A | | 6/1992 | Richard | |
| D368,249 | S | * | 3/1996 | Ferrer | D12/423 |
| 5,662,364 | A | * | 9/1997 | Reeb et al. | 292/230 |
| 5,683,126 | A | * | 11/1997 | De Vivo et al. | 292/230 |
| 5,799,849 | A | | 9/1998 | Beer et al. | |
| 5,924,615 | A | | 7/1999 | McGarrah | |
| 6,007,129 | A | * | 12/1999 | Kearney, Jr. | 296/37.6 |
| 6,019,238 | A | * | 2/2000 | Kindig et al. | 220/4.22 |
| 6,032,963 | A | | 3/2000 | Daugherty | |
| D426,059 | S | * | 6/2000 | Siler et al. | D3/294 |
| 6,079,741 | A | * | 6/2000 | Maver | 280/759 |
| 6,289,555 | B1 | * | 9/2001 | Nguyen et al. | 16/235 |
| 6,405,861 | B1 | * | 6/2002 | Siler et al. | 206/317 |
| 6,454,115 | B1 | * | 9/2002 | Allasia | 220/4.23 |
| 6,523,877 | B1 | * | 2/2003 | Damian | 296/37.6 |
| 6,561,399 | B1 | | 5/2003 | Loosbrock | |
| 6,837,383 | B1 | * | 1/2005 | McElhaney, Jr. | 211/70.6 |
| 6,875,405 | B1 | * | 4/2005 | Mathus et al. | 422/102 |

* cited by examiner

Primary Examiner—Nathan J. Newhouse
Assistant Examiner—Justin M. Larson

(57) ABSTRACT

The support unit is essentially a box-like structure having a bottom, a top, two opposing side walls, a front door, a locking device for the front door, and a rear wall opposing the front door. The front door is pivotally attached to the side walls and positioned to allow a tool box or other container to be removed from, or placed into the support unit when the door is open and to prevent removal of the container when the door is closed. The container support unit is designed to securely hold a toolbox, or other box-like container, such as a U.S. Army-issue ammunition can. The support unit can be mounted to the side wall of the cargo area of a pickup truck, under the top rail of the cargo area sidewall, in front or behind the wheel well and suspended above the floor of the cargo area. The support unit can also be mounted on other vehicles, such as a boat, or any other suitable structure, such as a garage wall.

7 Claims, 6 Drawing Sheets

Fig. 5
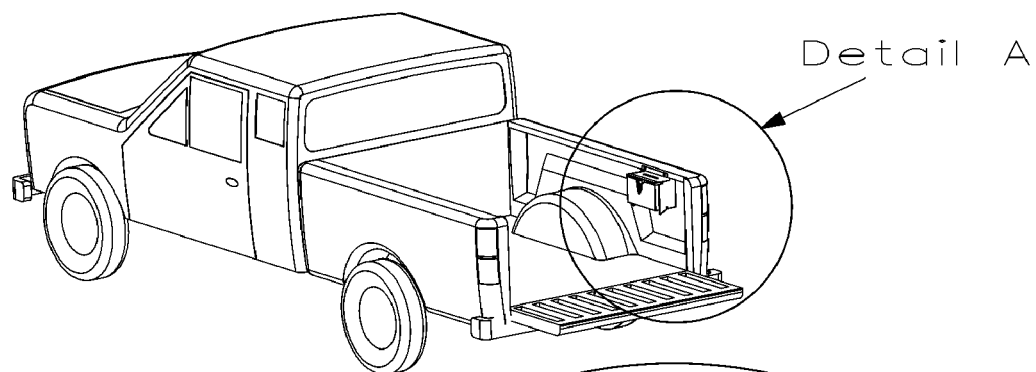
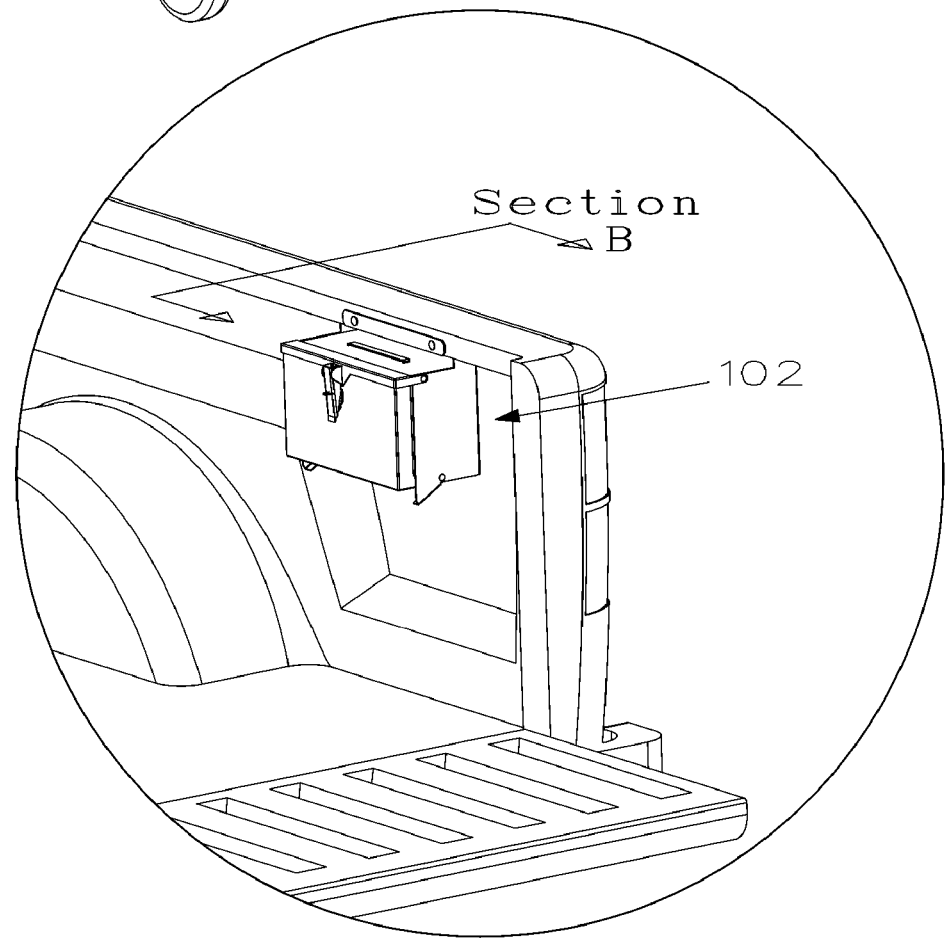
Detail A

Section B

SUPPORT UNIT FOR PICKUP TRUCK

BACKGROUND OF INVENTION

The present invention relates to a support unit for use in the cargo area of a pickup truck or other vehicle or structure. The lockable unit comprises a housing into which a toolbox or other storage container can be placed. In one embodiment of the invention, the support unit is configured to hold a U.S. Army-issue ammunition container (popularly known as an "ammo can"), these being readily available as Army Surplus and, because they are waterproof and durable, popular for storing various articles such as tools and fishing gear.

It is well known in the art to provide support units for mounting within the cargo area of a pickup truck. Loosbrock, in U.S. Pat. No. 6,561,399, describes a container holder that attaches to the inner sidewall of a pickup truck cargo area. The container holder is designed carry square plastic jugs of liquid and to be mounted above the wheel well. McGarrah, in U.S. Pat. No. 5,924,615, describes a hanging storage box for truck beds, including a hinged and lockable lid. The box mounting hardware is adjustable, allowing the box to be mounted at various heights and is shaped to allow mounting against the wall at the forward end of the cargo area. Beer et al., in U.S. Pat. No. 5,799,849, describes a safety carrier for stabilizing a pressurized bottle within the cargo area of a pickup truck. The safety carrier consists of a frame mounted to the truck bed and a rigid ring mounted to the frame. The pressurized bottle is held in-place within the rigid ring. Mullican, in U.S. Pat. No. 4,728,017, describes a storage container for mounting in the cargo area of a pickup truck. The storage container is mounted to the wall at the forward end of the cargo area using clamps that are removable when the lid of the storage unit is open and not accessible when the lid is closed. Farmer, in U.S. Pat. No. 5,052,737, describes an attachment structure for attaching a toolbox such that the toolbox spans the width of the pickup truck bed and is suspended above the floor of the cargo area and mounted to the side walls of the cargo area with clamping hardware. Other patents representative of prior art showing storage containers and other articles mounting in the cargo area of a pickup truck include:

May 29, 1962, Evans, U.S. Pat. No. 3,036,7498
1975, Lile, U.S. Pat. No. 3,893,5682
1992, Richard, U.S. Pat. No. 5,118,1567
2000, Daugherty, U.S. Pat. No. 6,032,963

SUMMARY OF INVENTION

The support unit is essentially a box-like structure having a bottom, a top, two opposing side walls, a front door, a locking device for the front door, and a rear wall opposing the front door. The front door is pivotally attached to the side walls and positioned to allow a tool box or other container to be removed from, or placed into the support unit when the door is open and to prevent removal of the container when the door is closed. The present invention substantially departs from the designs of the prior art in several ways. The present support unit is configured to be mounted within the pocket of space either in front of, or behind the wheel well typically found in the pickup cargo area. When mounted within this pocket, the support unit is suspended above the floor of the truck bed, allowing use of the entire floor for other cargo. The support unit is also configured such that neither the support unit, nor the container supported therein protrudes above the sidewall of the truck bed. This has the advantage of allowing the truck bed to be fitted with a flat cover, known commercially as a tonneau cover, without interfering with said support unit.

It is an object of this invention to provide a support unit which allows a toolbox or other storage container to be readily removed from said support unit and, alternately, secured to the support unit to deter theft.

It is another object of this invention for said support unit to be attachable to the cargo area of a pickup truck such that it is suspended above the floor of the cargo area, thereby allowing full use of the floor space for other cargo.

It is another object of this invention for said support unit to have an access door and mounting surfaces that allow said support unit to be mounted within the cargo area of a pickup truck in the pocket of space typically found under the top rail of the cargo area side wall, in front of or behind the wheel well, thereby minimizing the amount of usable cargo space occupied by said support unit.

It is another object of this invention for said support unit to be mountable within the cargo area of a pickup truck such that said support unit does not protrude above the cargo area sidewall.

BRIEF DESCRIPTION OF DRAWINGS

FIG. 5 is a perspective view of the exemplary support unit shown in FIG. 1, when the support unit is installed in a pickup truck.

DETAILED DESCRIPTION

In the description that follows, like element numerals are used to indicate like elements appearing in one or more of the figures.

Referring to FIGS. 1–6, an exemplary embodiment of container support unit according to the invention is shown in various views. Perspective views are shown in FIGS. 1, 2, 3 and 5, a left side view in FIG. 4, and a cross sectional view in FIG. 6. The container support unit is shown with the door closed in FIGS. 1,2,4,5 and 6, and with the door in a fully open position in FIG. 3. The exemplary embodiment is described below with reference to FIGS. 1–6 generally.

The container support unit comprises an enclosure 102 generally in the shape of a rectangular prism. Enclosure 102 may be formed from a sheet material, such as steel. It may be powder-coated, painted, or provided with any other protective coating for corrosion protection, and to enhance the appearance of the enclosure. In alternative embodiments, any other suitable metal, plastic, or other structural material may be substituted for sheet steel. In addition, enclosure 102 may be formed in different shapes, for example, cylindrical or spherical, with appropriate adjustments to other components of the container support unit, as should be apparent to one of skill in the art.

Figure 1:
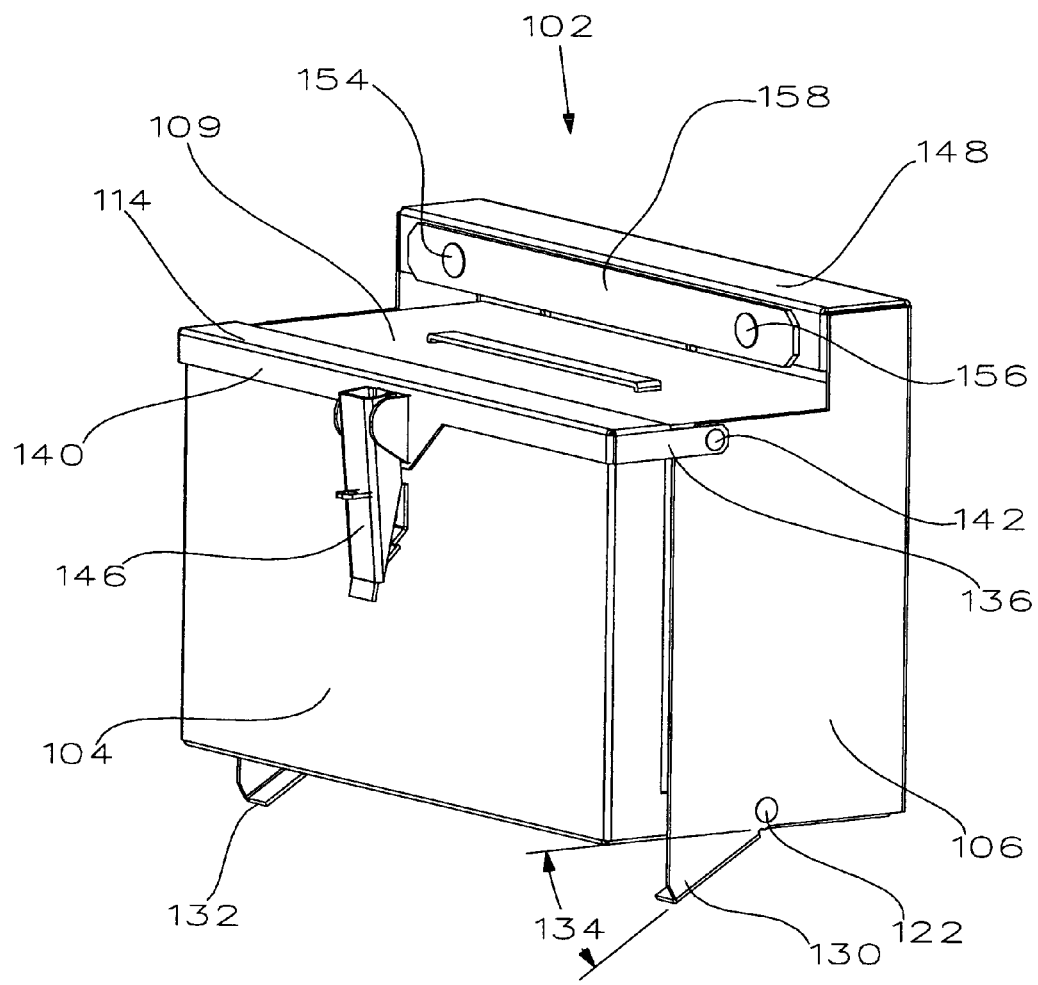
FIG. 1 is a perspective view of an exemplary support unit according to the invention, when the door is closed.
Figure 2:
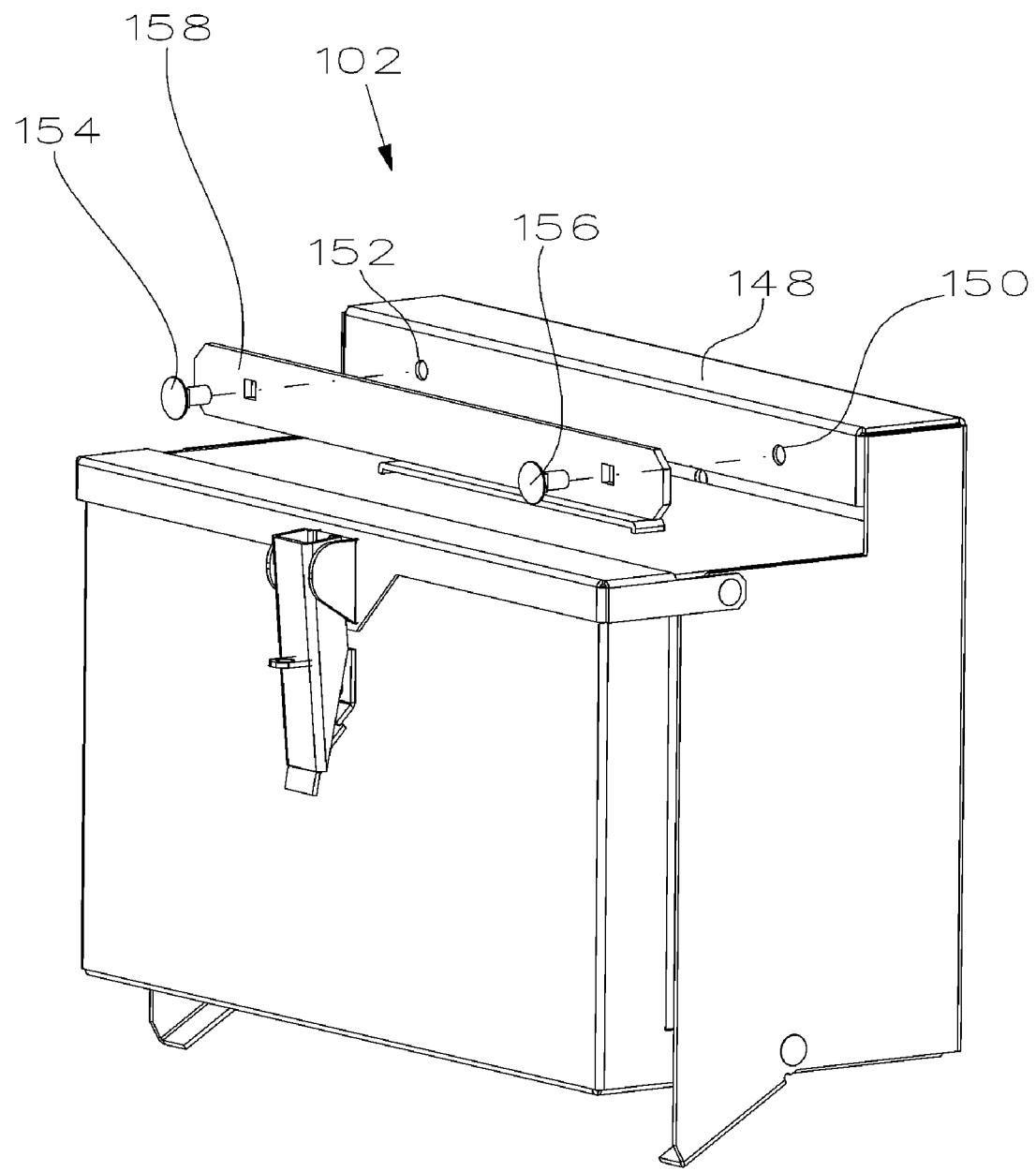
FIG. 2 is a perspective view of the exemplary support unit shown in FIG. 1, with mounting hardware shown in exploded view.
Figure 3:
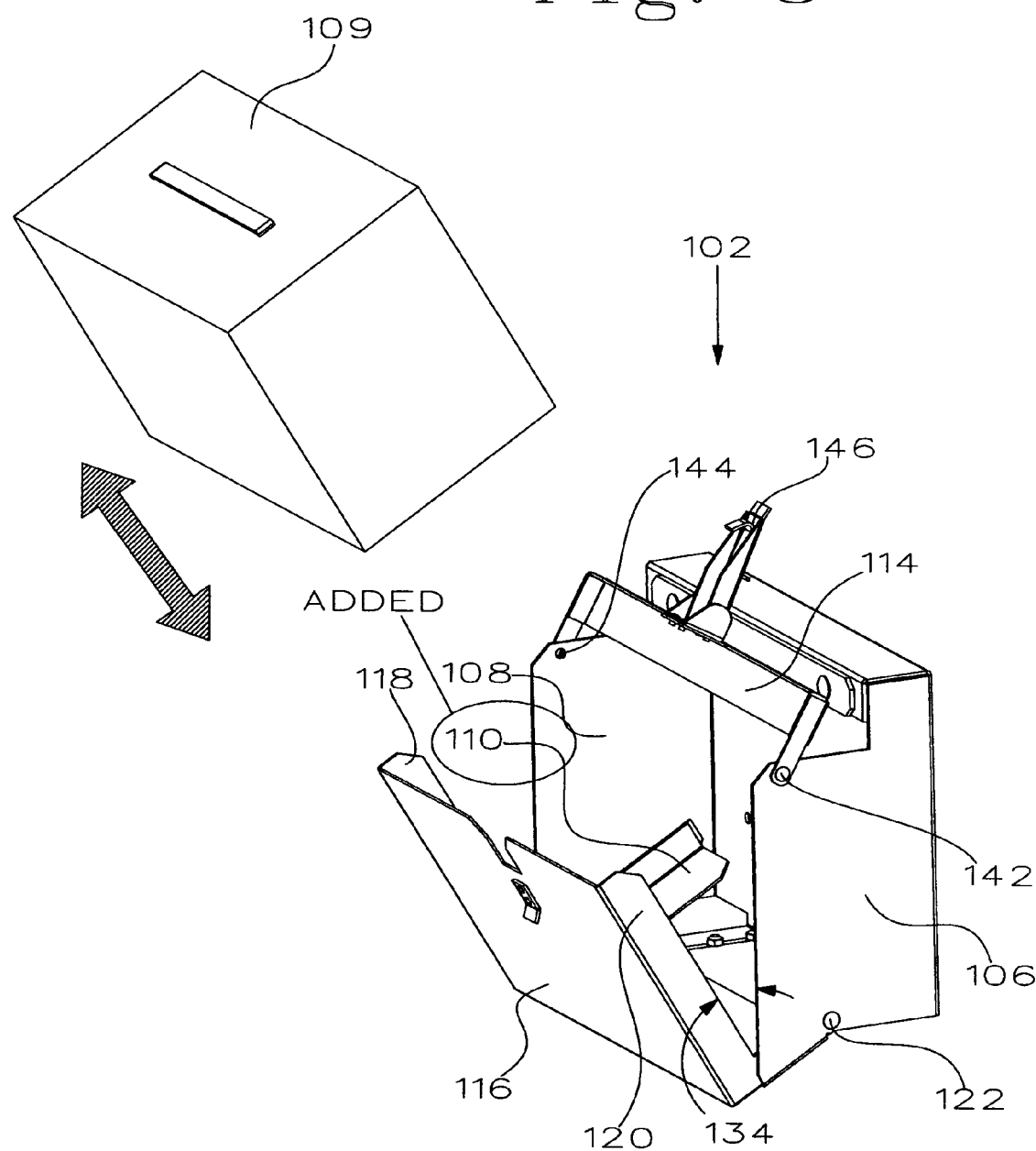
FIG. 3 is a perspective view of the exemplary support unit shown in FIG. 1, with the door open and the container removed along the direction shown by the bold arrow.
Figure 4:
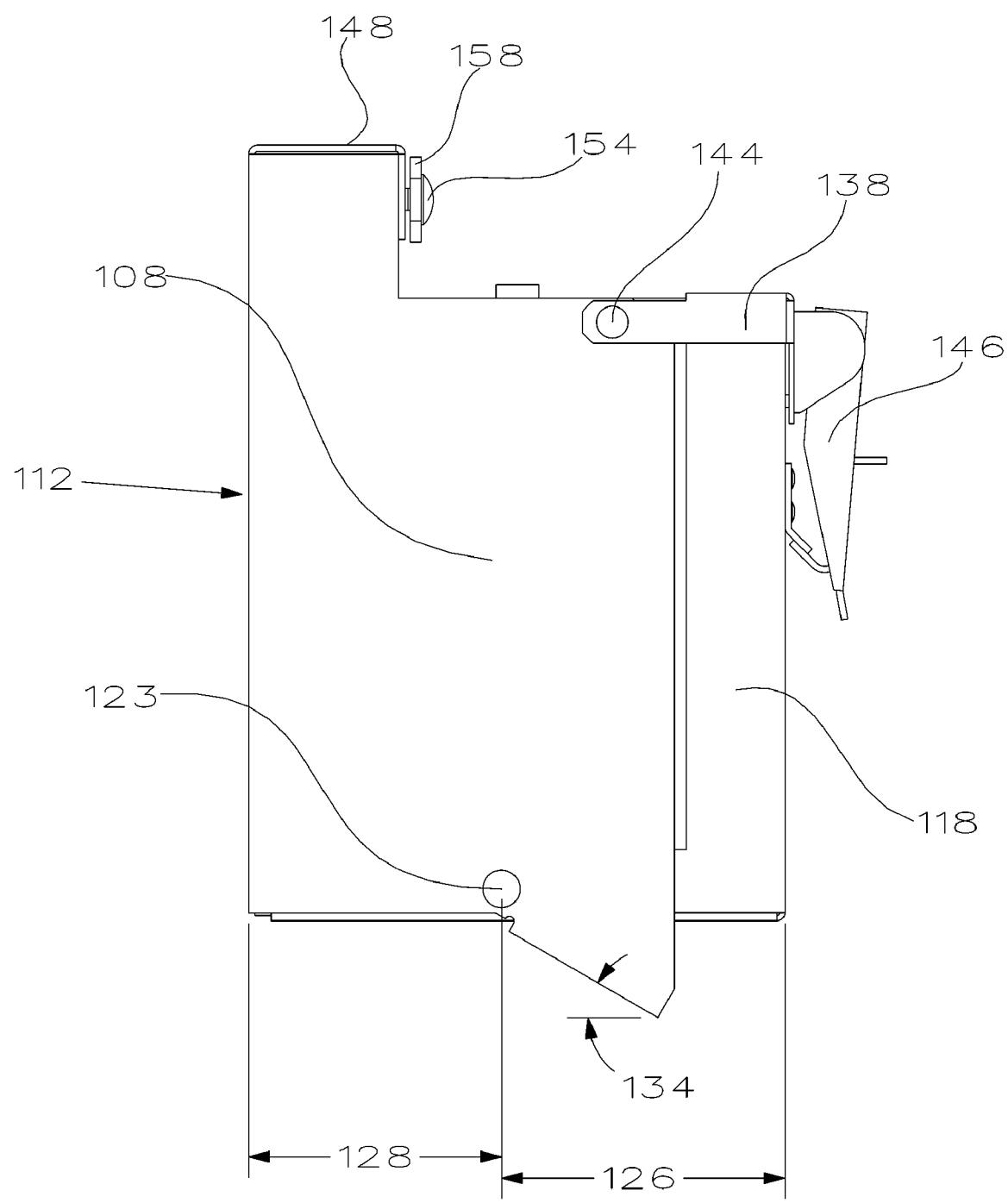
FIG. 4 is a left side view of the exemplary support unit shown in FIG. 1.
Figure 6:
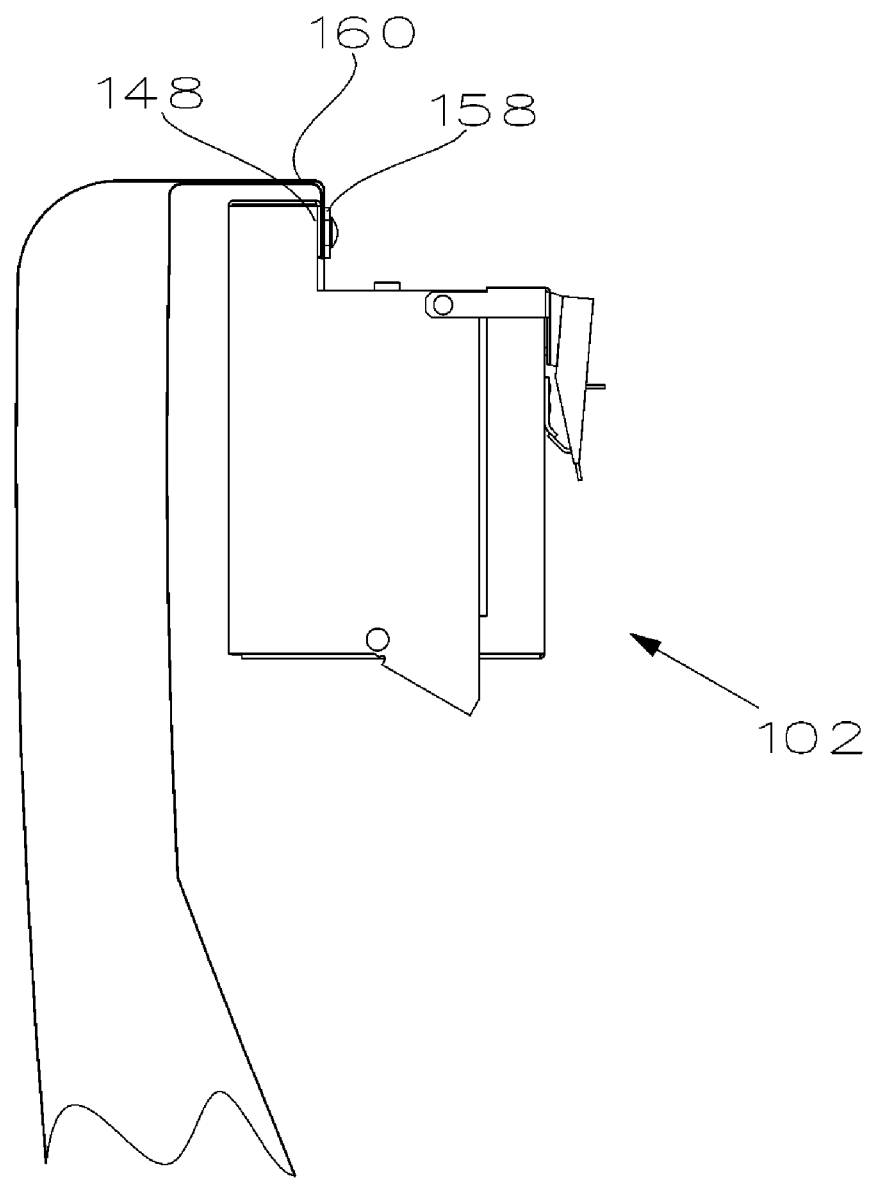
FIG. 6 is a cross-sectional view through the pickup truck cargo area, showing the exemplary support unit shown in FIG. 5 mounted in the pickup truck cargo area.

Enclosure 102 comprises a front wall 104, opposite side walls 106, 108, a bottom wall 110, a rear wall 112 and a latch bracket 114, and top mounting flange 148. It may be advantageous to form front wall 104 and bottom wall 110 from a single piece of sheet material, which may therefore serve as an L-shaped access door 116 for enclosure 102. Access door 116 provides access to the interior of enclosure 102 as well as support for a toolbox 109 or other storage container. In one embodiment of the invention, access door 116 is configured to carry a U.S. Army-issue ammunition can. It may also be advantageous for door side walls 118,120 to be disposed on access door 116, which may serve to strengthen access door 116 and provide material for pivot points 122, 123. FIG. 4 is a side view of support unit 102 showing distances 126 and 128. Pivot points 122, 123 are disposed on door sidewalls 118, 120 with distance 126 being greater than distance 128. Door side walls 118,120 are pivotally attached to enclosure side walls 106,108 at pivot points 122,123, allowing access door 116 to swing between an open position and a closed position. Since distance 126 is greater than distance 128, access door 116 will tend to swing open by force of gravity.

Flanges 130,132 are disposed on the lower edges of side walls 106,108 in front of pivot points 122,123 and at angle 134 to the horizontal plane. Flanges 130,132 provide a stopping point for access door 116 while it swings out and down around pivot points 122,123 and through angle 134. Angle 134 is less than 90 degrees and is large enough to allow removal of container 109 from or placement into support unit 102 when door 116 is fully open and resting on flanges 130 and 132.

It may be advantageous for bracket latch sidewalls 136 and 138 and bracket latch front wall 140 to be disposed on latch bracket 114, which may serve to strengthen latch bracket 114 and to provide material for pivot points 142 and 144 as well as material to attach latch 146 to latch bracket 114. Latch bracket 114 is pivotally attached to sidewalls 106,108 at pivot points 142, 144. Latch 146 serves to lock latch bracket 114 to access door 116 and to provide means for attaching a padlock or other locking device for security. When latch 146 is opened, latch bracket 114 may therefore pivot up and back, releasing access door 116 to swing through angle 134 to the open position. Container 109 may then be removed from support unit 102 through the opening provided by access door 116 and latch bracket 114 in their open positions.

Top mounting flange 148 is disposed on back wall 112. It may be advantageous to extend sidewalls 106 and 108 to mounting flange 148 where sidewalls 106 and 108 may be welded to mounting flange 148 which may serve to strengthen support unit 102. Mounting holes may be disposed on mounting flange 148. In one embodiment of the invention, two mounting holes 150, 152 are provided through which mounting bolts 154 and 156 may pass. A similar hole pattern is disposed on mounting bracket 158. Support unit 102 may therefore be attached to top rail 160 of the sidewall of a pickup truck cargo area by drilling a similar hole pattern in side-rail 160 and passing mounting bolts 154 and 156 through bracket 158 then through side-rail 160 then through mounting flange 148. Nuts may be tightened onto bolts 154 and 156 to secure support unit 102 to top rail 160. In one embodiment of the invention, additional mounting holes are disposed on back wall 112 at various locations to facilitate mounting support unit 102 to other locations within the pickup truck bed, or other types of vehicles or other structures.

The invention claimed is:

1. A container support unit for mounting in the cargo area of a pickup truck comprising;
   a housing having walls, the housing walls comprising a flat rectangular back, two opposing flat sidewalls extending forward from said back, a bottom extending between said sidewalls and said back, a flat rectangular front door pivotally attached to said sidewalls near its lower corners, a top connecting said sidewalls and said back, said top extending forward from the upper edge of said back to cover an internal cavity formed by of said support unit, said mounting flange and back configured with mounting holes to facilitate attachment to the sidewall of a pickup truck cargo area in the pocket of space typically found in front of, or behind a wheel well;
   a latch bracket pivotally attached to said housing sidewalls near the upper edge of said front door, in a closed orientation, said latch bracket being secured to said front door by a lockable latch.

2. The container support unit of claim 1, wherein said front door comprises a front wall and said bottom wall formed from a single piece of material, together pivotally attached to said sidewalls near the lower front corners of said support unit, said front door configured to support the weight of a toolbox or other container, placed in the support unit when said front door is opened and closed.

3. The container support unit of claim 2, wherein flanges are disposed inward along the lower edges of said sidewalls, said flanges extending inward toward the underside of said front door and at an acute angle to said bottom wall with said front door in a closed position, said flanges configured to act as a stop for said front door as it is opened.

4. The container support unit of claim 1, wherein said back, sidewalls and top mounting flange are formed from a single piece of sheet material.

5. The container support unit of claim 1, wherein the entire assembly is fabricated from steel plate material.

6. The container support unit of claim 1, wherein said mounting flange is a rectangular flange configured to fit within the space typically found under the upper edge of the sidewall of the pickup truck cargo area, in front of, or behind a wheel well.

7. The container support unit of claim 1, wherein said support unit is configured in shape to carry a an ammunition container.

* * * * *